(12) United States Patent
Stamper

(10) Patent No.: US 10,464,451 B2
(45) Date of Patent: Nov. 5, 2019

(54) SWIVELING CAR SEAT SYSTEM

(71) Applicant: Linda Stamper, Brownstone, MI (US)

(72) Inventor: Linda Stamper, Brownstone, MI (US)

( * ) Notice: Subject to any disclaimer, the term of this patent is extended or adjusted under 35 U.S.C. 154(b) by 199 days.

(21) Appl. No.: 15/622,801

(22) Filed: Jun. 14, 2017

(65) Prior Publication Data
US 2018/0361889 A1 Dec. 20, 2018

(51) Int. Cl.
B60N 2/28 (2006.01)

(52) U.S. Cl.
CPC .................. B60N 2/2869 (2013.01)

(58) Field of Classification Search
CPC .................................................. B60N 2/2869
See application file for complete search history.

(56) References Cited

U.S. PATENT DOCUMENTS

| | | | | |
|---|---|---|---|---|
| 5,380,062 A | * | 1/1995 | Nania | B60N 2/2821 248/429 |
| D362,346 S | | 9/1995 | Clarke | |
| 6,015,188 A | * | 1/2000 | Yundt | A47C 3/16 297/242 |
| 6,196,629 B1 | | 3/2001 | Onishi et al. | |
| 6,241,314 B1 | * | 6/2001 | Pufall | B60N 2/2821 297/256.12 |
| 6,793,283 B1 | * | 9/2004 | Sipos | B60N 2/062 297/256.12 |
| 7,073,859 B1 | | 7/2006 | Wilson | |
| 7,357,451 B2 | | 4/2008 | Bendure et al. | |
| 7,575,276 B1 | | 8/2009 | Henry | |
| 7,712,830 B2 | | 5/2010 | Lhomme et al. | |
| 7,770,970 B2 | * | 8/2010 | Hei | B60N 2/2806 297/256.12 |

FOREIGN PATENT DOCUMENTS

WO    WO9003746    4/1990

* cited by examiner

Primary Examiner — David R Dunn
Assistant Examiner — Tania Abraham

(57) ABSTRACT

A swiveling car seat system for facilitating a car seat to be rotated in a vehicle includes a car seat that selectively has a child seated therein. The car seat is selectively positioned on a seat in a vehicle. A swivel unit is coupled to the car seat and the swivel unit abuts the seat in the vehicle when the car seat is positioned in the vehicle. The car seat is rotatable on the swivel such that the car seat selectively faces a door on the vehicle thereby enhancing removing and placing the child in the car seat.

5 Claims, 4 Drawing Sheets

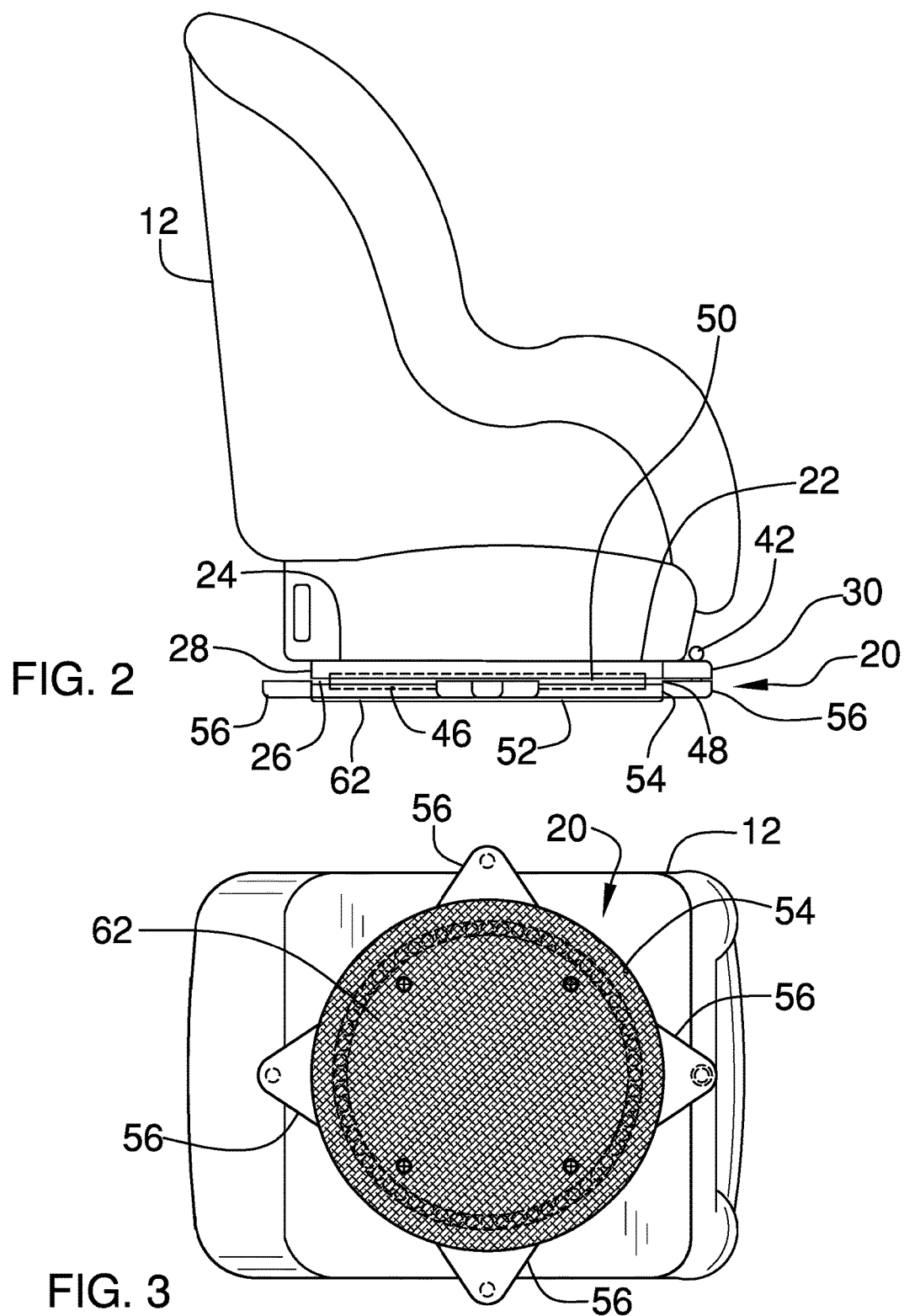

SWIVELING CAR SEAT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to swiveling devices and more particularly pertains to a new swiveling device for facilitating a car seat to be rotated in a vehicle.

BRIEF SUMMARY OF THE INVENTION

An embodiment of the disclosure meets the needs presented above by generally comprising a car seat that selectively has a child seated therein. The car seat is selectively positioned on a seat in a vehicle. A swivel unit is coupled to the car seat and the swivel unit abuts the seat in the vehicle when the car seat is positioned in the vehicle. The car seat is rotatable on the swivel such that the car seat selectively faces a door on the vehicle thereby enhancing removing and placing the child in the car seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a right side view of an embodiment of the disclosure.

FIG. 3 is a bottom view of an embodiment of the disclosure.

DETAILED DESCRIPTION OF THE INVENTION

Figure 1:
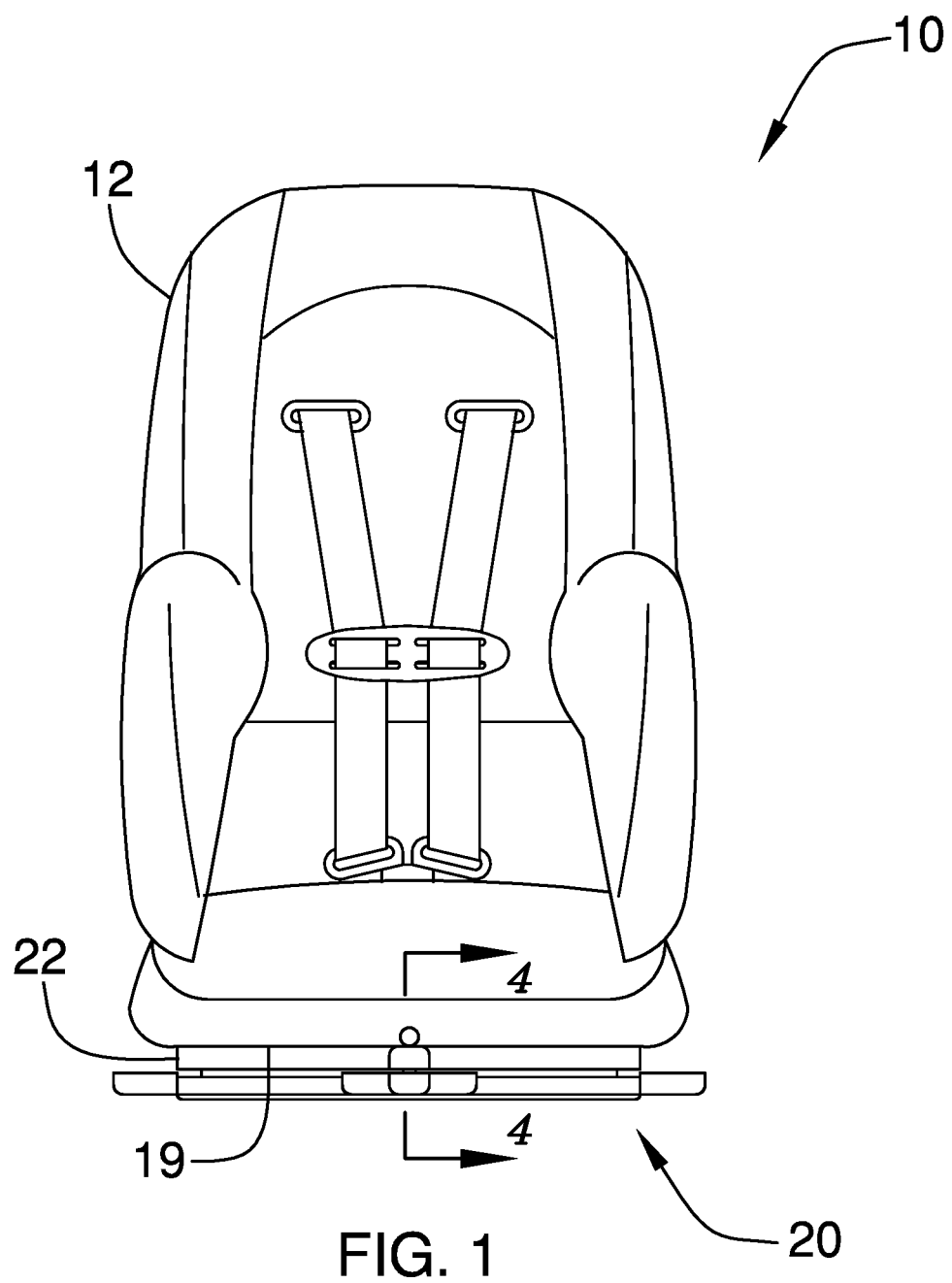
FIG. 1 is a front view of a swiveling car seat system according to an embodiment of the disclosure.
Figure 4:
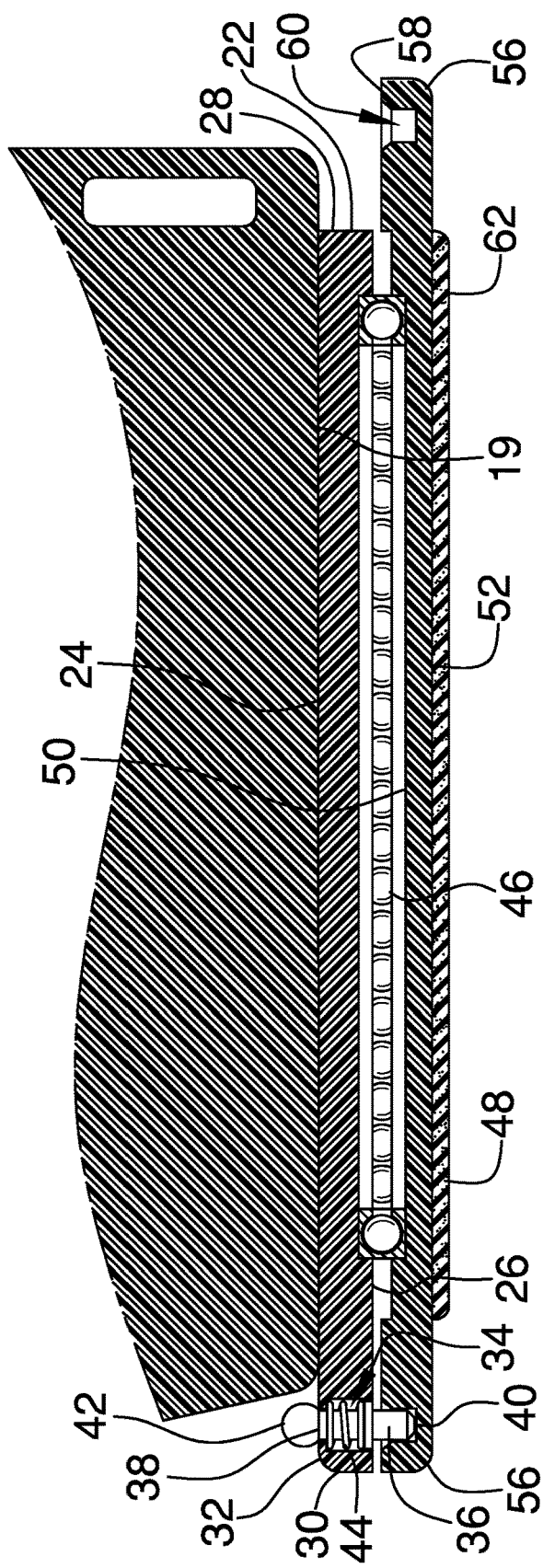
FIG. 4 is a cross sectional view taken along line 4-4 of FIG. 1 of an embodiment of the disclosure.
Figure 5:
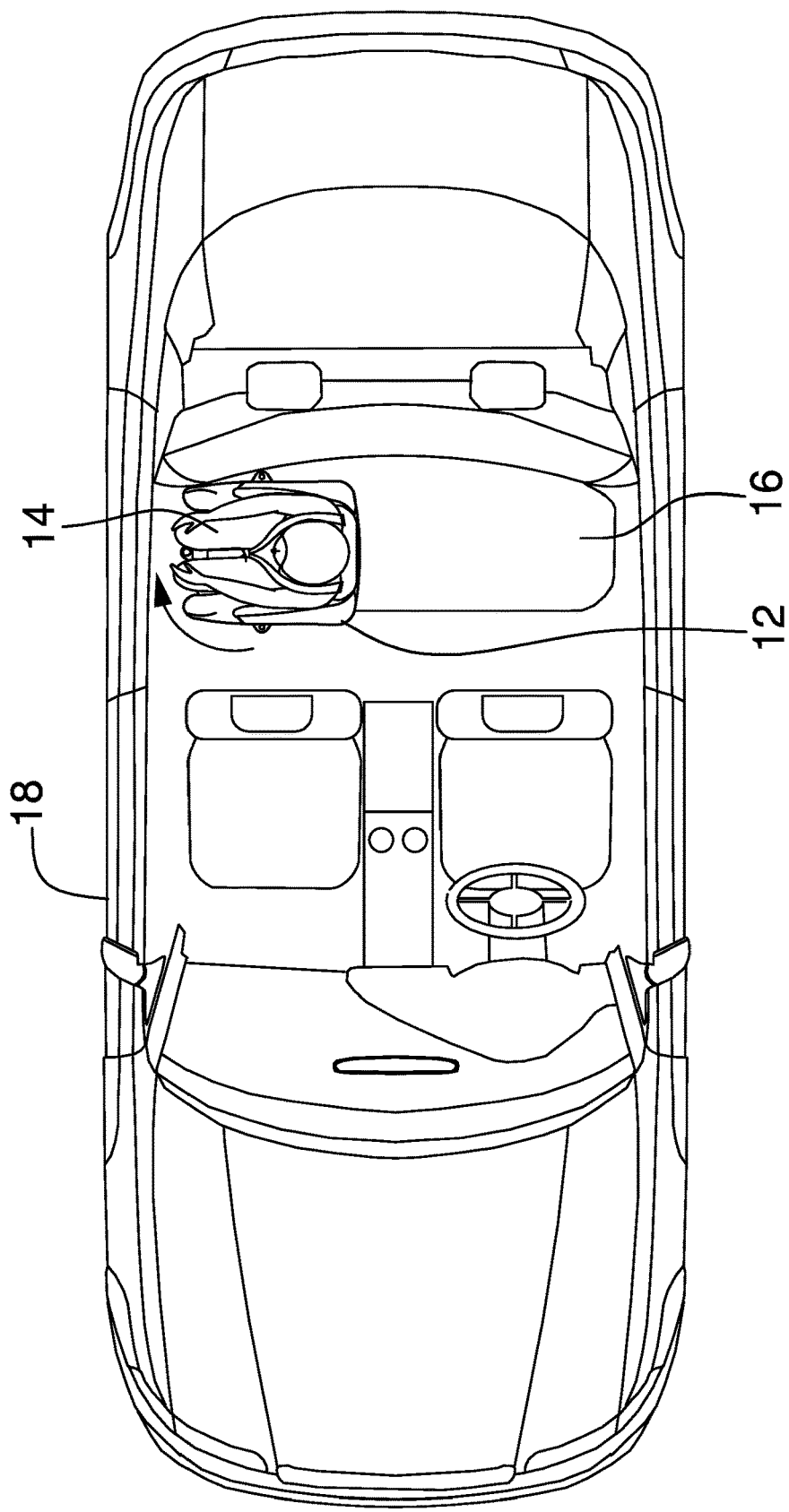
FIG. 5 is a perspective in-use view of an embodiment of the disclosure.

With reference now to the drawings, and in particular to FIGS. 1 through 5 thereof, a new swiveling device embodying the principles and concepts of an embodiment of the disclosure and generally designated by the reference numeral 10 will be described.

As best illustrated in FIGS. 1 through 5, the swiveling car seat system 10 generally comprises a car seat 12 that has a child 14 selectively seat 16ed therein. The car seat 12 is selectively positioned on a seat 16 in a vehicle 18 and the car seat 12 has a bottom side 19. The car seat 12 may be a child 14 car seat 12 of any conventional design and the vehicle 18 may be a passenger vehicle 18 or the like. A swivel unit 20 is coupled to the car seat 12 and the swivel unit 20 abuts the seat 16 in the vehicle 18 when the car seat 12 is positioned in the vehicle 18. The car seat 12 is rotatable on the swivel such that the car seat 12 is rotatable to selectively face a door on the vehicle 18. In this way swivel enhances removing and placing the child 14 in the car seat 12.

The swivel unit 20 comprises a first plate 22 that has a first surface 24, a second surface 26 and a peripheral edge 28 extending therebetween. The first surface 24 is coupled to the bottom side 19 of the car seat 12 and the peripheral edge 28 has a first tab 30 extending outwardly therefrom. The first tab 30 has an upwardly facing surface 32 and the upwardly facing surface 32 has a first well 34 extending downwardly therein. A pin 36 is slidably positioned in the first well 34 and the pin 36 is selectively manipulated. The pin 36 has a first end 38 and second end 40, and the pin 36 extends downwardly through the tab. A knob 42 is coupled to the first end 38 of the pin 36 to enhance gripping the pin 36 and the second end 40 is spaced from the second surface 26 of the first plate 22. A biasing member 44 is positioned around the pin 36 and the biasing member 44 biases the pin 36 to extend downwardly through the first tab 30.

A bearing 46 is coupled to the second surface 26 of the first plate 22 and the bearing 46 is continuous such that the bearing 46 forms a closed loop. The bearing 46 may be a ball bearing 46 or any other friction reducing bearing 46. A second plate 48 is provided that has a primary surface 50, a secondary surface 52 and a perimeter edge 54 extending therebetween. The primary surface 50 is coupled to the bearing 46 such that the second plate 48 is rotatably coupled to the first plate 22 having the perimeter edge 54 being aligned with the peripheral edge 28. In this way the car seat 12 is rotatable about an axis extending through the first surface 24 and the second surface 26 of the first plate 22. The secondary surface 52 of the second plate 48 abuts the seat 16 in the vehicle 18 when the car seat 12 is positioned in the vehicle 18.

The perimeter edge 54 has a plurality of second tabs 56 extending outwardly therefrom. The second tabs 56 are spaced apart from each other and are distributed around the perimeter edge 54. Each of the second tabs 56 has a top surface 58 and the top surface 58 corresponding to each of the second tabs 56 has a second well 60 extending downwardly therein. The second well 60 in a corresponding one of the second tabs 56 insertably receives the second end 40 of the pin 36 when the first tab 30 is aligned with the corresponding second tab 56. In this way the car seat 12 is retained at a selected point of rotation about the axis. The swivel unit 20 may be a unitary structure with respect to the car seat 12 and the swivel unit 20 may be retrofitted onto an existing car seat 12. A mat 62 is coupled to the secondary surface 52 of the second plate 48 and the mat 62 frictionally engages the seat 16 in the vehicle 18.

In use, the car seat 12 is positioned on the seat 16 in the vehicle 18. The knob 42 on the pin 36 is gripped and the pin 36 is urged upwardly. Thus, the car is rotatable on the second plate 48 thereby facilitating the first tab 30 to be aligned with a selected one of the second tabs 56. The pin 36 is released and the pin 36 engages the second well 60 in the selected tab to inhibit the car seat 12 from rotating on the second plate 48. In this way the car seat 12 is rotated to face the door on the vehicle 18 and the child 14 is positioned in the car seat 12 thereby enhancing placing the child 14 in and removing the child 14 from the car seat 12. The pin 36 is urged upwardly and the car seat 12 is rotated to face forwardly in the car. The pin 36 is released to retain the car seat 12 facing forwardly thereby facilitating the car seat 12 to function in accordance with the car seat 12 manufacturer's recommendations.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A swiveling car seat system comprising:
    a car seat being configured to have a child seated therein, said car seat being configured to be positioned on a seat in a vehicle, said car seat having a bottom side; and
    a swivel unit being coupled to said car seat wherein said swivel unit is configured to abut the seat in the vehicle when said car seat is positioned in said vehicle, said car seat being rotatable on said swivel unit wherein said car seat is configured to selectively face a door on the vehicle thereby enhancing removing and placing the child in said car seat, said swivel unit comprising
    a first plate having a first surface, a second surface and a peripheral edge extending therebetween, said first surface being coupled to said bottom side of said car seat, said peripheral edge having a first tab extending outwardly therefrom, said first tab having an upwardly facing surface, said upwardly facing surface having a first well extending downwardly therein, and
    a bearing being coupled to said second surface of said first plate, said bearing being continuous such that said bearing forms a closed loop, and
    a second plate having a primary surface, a secondary surface and a perimeter edge extending therebetween, said primary surface being coupled to said bearing such that said second plate is rotatably coupled to said first plate having said perimeter edge being aligned with said peripheral edge, said car seat being rotatable about an axis extending through said first surface and said second surface of said first plate, said secondary surface being configured to abut the seat in the vehicle when said car seat is positioned in the vehicle.

2. The system according to claim 1, further comprising a pin being slidably positioned in said first well wherein said pin is configured to be manipulated, said pin extending downwardly through said tab.

3. The system according to claim 1, wherein perimeter edge has a plurality of second tabs extending outwardly therefrom, said second tabs being spaced apart from each other and being distributed around said perimeter edge, each of said second tabs having a top surface, said top surface corresponding to each of said second tabs having a second well extending downwardly therein.

4. The system according to claim 3, wherein:
    said first plate has a first tab, said first tab having a pin; and
    said second well in a corresponding one of said second tabs insertably receives said pin when said first tab is aligned with said corresponding second tab such that said car seat is retained at a selected point of rotation about said axis.

5. A swiveling car seat system comprising:
    a car seat being configured to have a child seated therein, said car seat being configured to be positioned on a seat in a vehicle, said car seat having a bottom side; and
    a swivel unit being coupled to said car seat wherein said swivel unit is configured to abut the seat in the vehicle when said car seat is positioned in said vehicle, said car seat being rotatable on said swivel unit wherein said car seat is configured to selectively face a door on the vehicle thereby enhancing removing and placing the child in said car seat, said swivel unit comprising:
    a first plate having a first surface, a second surface and a peripheral edge extending therebetween, said first surface being coupled to said bottom side of said car seat, said peripheral edge having a first tab extending outwardly therefrom, said first tab having an upwardly facing surface, said upwardly facing surface having a first well extending downwardly therein,
    a pin being slidably positioned in said first well wherein said pin is configured to be manipulated, said pin extending downwardly through said tab,
    a biasing member being positioned around said pin, said first biasing member biasing said pin to extend downwardly through said first tab, a bearing being coupled to said second surface of said first plate, said bearing being continuous such that said bearing forms a closed loop, a second plate having a primary surface, a secondary surface and a perimeter edge extending therebetween, said primary surface being coupled to said bearing such that said second plate is rotatably coupled to said first plate having said perimeter edge being aligned with said peripheral edge, said car seat being rotatable about an axis extending through said first surface and said second surface of said first plate, said secondary surface being configured to abut the seat in the vehicle when said car seat is positioned in the vehicle, perimeter edge having a plurality of second tabs extending outwardly therefrom, said second tabs being spaced apart from each other and being distributed around said perimeter edge, each of said second tabs having a top surface, said top surface corresponding to each of said second tabs having a second well extending downwardly therein, said second well in a corresponding one of said second tabs insertably receiving said pin when said first tab is aligned with said corresponding second tab such that said car seat is retained at a selected point of rotation about said axis.

\* \* \* \* \*